United States Patent [19]
Ronalds

[11] 3,869,810
[45] Mar. 11, 1975

[54] TEACHING MACHINE
[76] Inventor: Hugh C. Ronalds, 220 Locust St. 26A, Philadelphia, Pa. 19106
[22] Filed: Oct. 29, 1973
[21] Appl. No.: 410,636

[52] U.S. Cl. .................................................. 35/9 C
[51] Int. Cl. ........................................... G09b 7/00
[58] Field of Search ............. 35/8 R, 9 R, 9 A, 9 B, 35/9 C, 9 E, 22 R, 48 R, 48 A, 48 B, 30

[56] References Cited
UNITED STATES PATENTS

| | | | |
|---|---|---|---|
| 2,564,089 | 8/1951 | Williams et al. | 35/9 B |
| 3,100,352 | 8/1963 | Boissevain | 35/48 R X |
| 3,127,588 | 3/1964 | Harmon | 340/146.3 |
| 3,736,671 | 6/1973 | Oleinick | 35/9 C |
| 3,740,869 | 6/1973 | Pleasants | 35/9 C |
| 3,771,240 | 11/1973 | Matui | 35/9 C |

Primary Examiner—Robert W. Michell
Assistant Examiner—Vance Y. Hum
Attorney, Agent, or Firm—Lockwood, Dewey, Zickert & Alex

[57] ABSTRACT

Machine for self-teaching a student including a base on which is received interchangeable cards having questions and multiple-choice answers as well as the answers for the questions, and a housing on the base for receiving the answer section of the cards to normally conceal it from the student. The housing includes a semi-opaque window which permits viewing of the answer section upon the energization of a light source within the housing. A hand-held probe is used to penetrate holes in the card and contact terminals on the base for operating the machine and controlling circuitry to illuminate the answer section for viewing in the event a correct answer is chosen and preclude illumination in the event an incorrect answer is chosen to prevent guessing.

18 Claims, 7 Drawing Figures

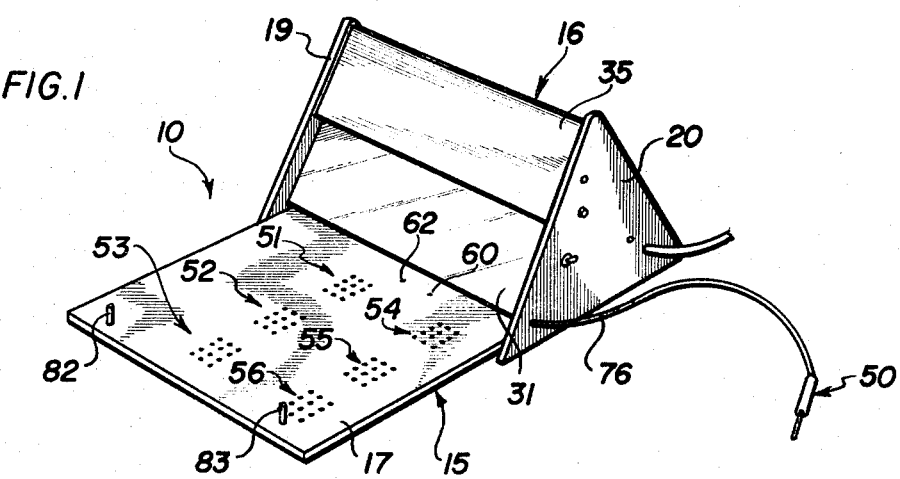
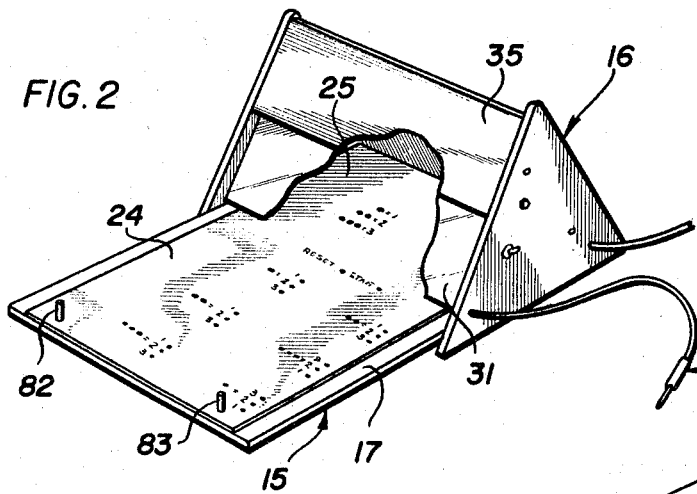
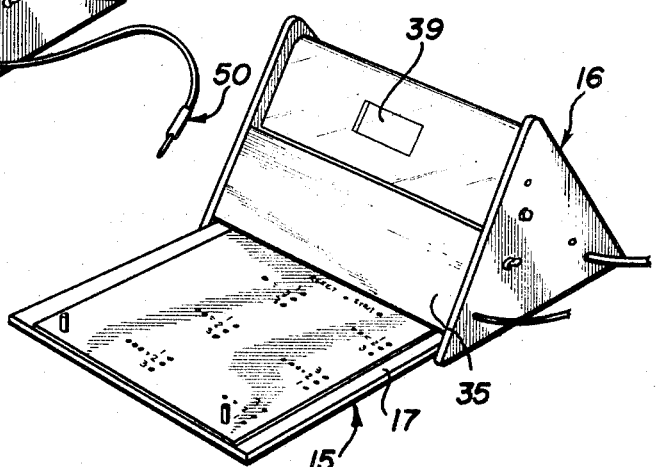
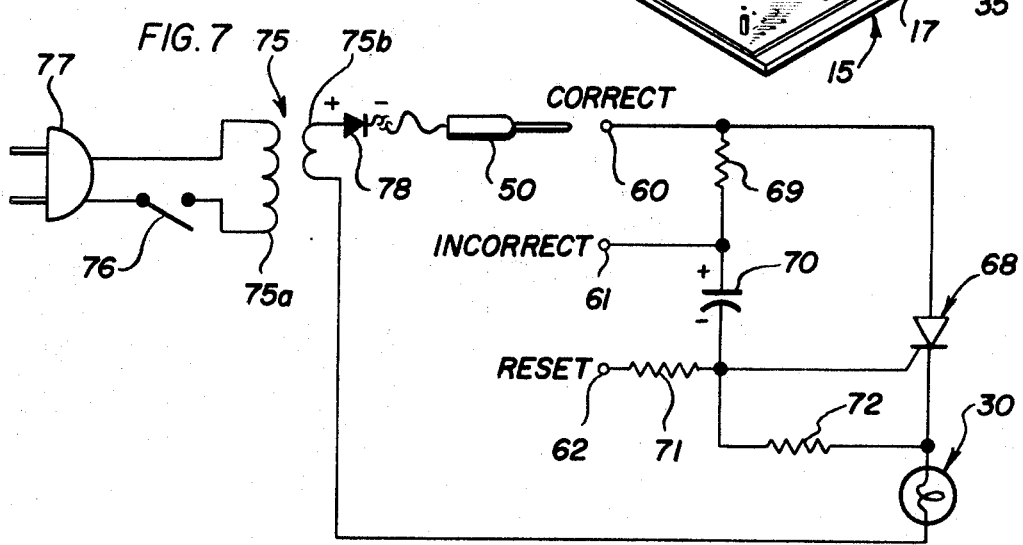

TEACHING MACHINE

This invention relates in general to a teaching machine, and more particularly to a machine capable of using interchangeable cards with questions or problems having multiple-choice answers, and still more particularly to a teaching machine operable by a student having signaling means for determining whether a correct answer is chosen for each of the questions.

Heretofore, it has been known to provide teaching machines utilizing interchangeable cards having various questions or problems to be solved by the user of the machine. It has also been known to provide cards having holes registering with contacts so that a probe may penetrate a hole and engage a contact for indicating through an electric circuit whether a correct or incorrect answer has been chosen. U.S. Pat. Nos. 3,100,352, 3,124,883, 3,106,784, 3,314,166, 3,561,136 and 3,575,545 illustrate the most pertinent prior art known.

One of the problems encountered by heretofore known machines is the lack of preventing the user from guessing in the event the first answer chosen is incorrect. One of the important features of the present invention overcomes this difficulty by providing means that will not allow the user to guess in the event the first answer chosen is incorrect, thereby making a more lasting impression on the user that he does not known the correct answer to a question or problem presented and forcing the user to learn before again trying to solve the problem.

Heretofore, any signaling means associated with answering a question or problem did nothing more than indicate to the user whether the answer was correct or incorrect. Another feature of the present invention is that it includes an arrangement whereby the user may view an answer section of the card upon having chosen a correct answer to a particular question so as to provide instruction for answering of the other problems. Accordingly, better self-teaching procedures are possible with the machine of the present invention.

It is therefore an object of the present invention to provide a new and improved teaching machine utilizing interchangeable cards having question and answer sections to enable the user to effectively practice self-teaching methods.

Another object of the present invention is to provide a teaching machine utilizing interchangeable cards having questions or problems with multiple-choice answers wherein means is included to prevent guessing should the first chosen answer of any question be incorrect.

Another object of this invention is in the provision of a teaching machine utilizing interchangeable cards having question and answer sections wherein the machine conceals the answer section normally but reveals the answer section in the event that a correct answer for a question is chosen, thereby permitting self-teaching methods of learning the correct answers to the other problems.

Another object of the invention resides in the provision of a teaching machine utilizing interchangeable cards having question and answer sections wherein each question includes multiple-choice answers registering with holes to be penetrated by a probe in answering of the question and wherein the machine is capable of receiving cards having the correct answers to the problems in various locations relative to the incorrect answers.

Other objects, features and advantages of the invention will be apparent from the following detailed disclosure, taken in conjunction with the accompanying sheets of drawings, wherein like reference numerals refer to like parts, in which:

FIG. 1 is a perspective view of the teaching machine according to the present invention;

FIG. 2 is a view similar to FIG. 1 but illustrating a question and answer card mounted on the machine and having a part of the housing broken away to show where the answer section of the card is positioned;

FIG. 3 is a view similar to FIGS. 1 and 2 and showing a question and answer card in place and also illustrating a shield swung into position to block the semi-opaque window aligned with the answer section;

FIG. 7 is a schematic diagram of the electrical circuitry for the machine.

The teaching machine of the present invention is especially useful for teaching young children simple mathematics and/or the association of words with objects by utilizing interchangeable cards having pictorial and/or textual matter thereon in multiple-choice question fashion. The cards include a question section and an answer section. A plurality of multiple-choice questions are provided in the question section wherein each would have one correct answer and one or more incorrect answers aligned with a hole in the card to permit choosing by the user. Additionally, the question section includes a start hole and a reset hole. The machine of the invention includes a base having an exposed area for receiving in alignment therewith the answer section. The concealed area is defined by a housing on the base which includes a semi-opaque window that effectively becomes transparent upon the energization of a light source within the housing so that the user can view the answer section when the light source is energized. The question area of the base includes correct terminals, incorrect terminals, a start terminal and a reset terminal. The correct terminal would register with the correct answer hole of each question, while the incorrect terminals would register with the incorrect answer holes. The start and reset terminals would register with the start and reset holes of the card. Orientation means is provided on the card and the base which coact to properly locate the card so that the holes in the card register with the proper terminals. A hand-held probe is utilized for operating the machine by penetrating any of the holes in the answer section. The terminals and the probe are together with the light source connected to a circuitry whereby first contact by the probe of the start terminal or a correct terminal for a question will cause energization of the light source to illuminate the answer section and permit viewing through the semi-opaque window. Such permits the user to absorb the answer information for use in answering the questions.

In the event an incorrect answer is chosen to a problem, the circuitry is conditioned so that further guessing of the answer will not allow energization of the light source. This prevents guessing by the user. In order to recondition the circuitry for normal use thereafter, it is necessary to apply the probe to the reset terminal. Thereafter, application of the probe to a start terminal or a correct answer will again cause energization of a light source and illumination of the answer section.

Figure 6:
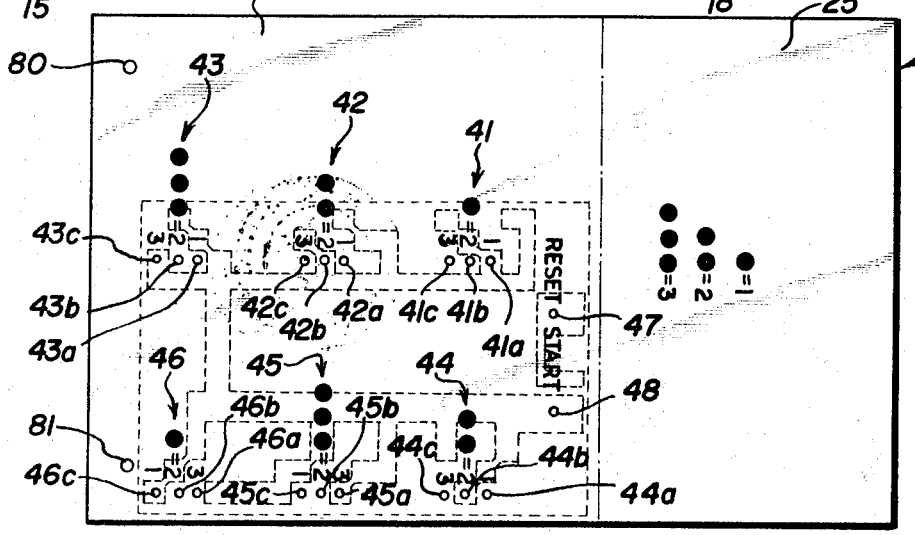
FIG. 6 is a plan view of a question and answer card of the type usable with the machine of the invention and showing in phantom the terminal arrangement illustrated in FIG. 4 as it would be to provide the correct registration of answer holes to the correct and incorrect terminals.

Referring now to the drawings, the teaching machine of the invention, generally designated by the numeral 10, as seen in FIG. 1, utilizes interchangeable cards such as that generally designated by the numeral 11 in FIG. 6. The card of FIG. 6 is merely illustrative of one type of question and answer material that can be used with the present machine. In particular, this card illustrates mathematical problems, but it should be appreciated that any type of question or problem set-up may be utilized consistent with multiple-choice type answers.

Figure 4:
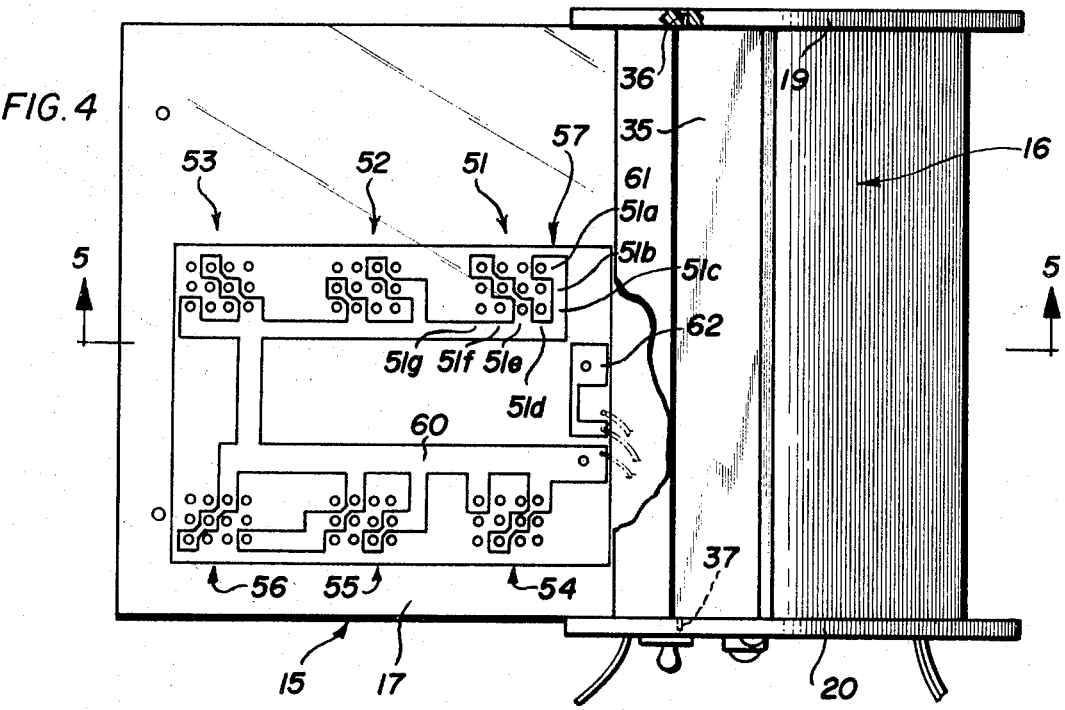
FIG. 4 is a somewhat enlarged plan view of the machine and illustrating the terminals on the base as applied in the form of printed circuitry and with some parts broken away to show underlying parts.
Figure 5:
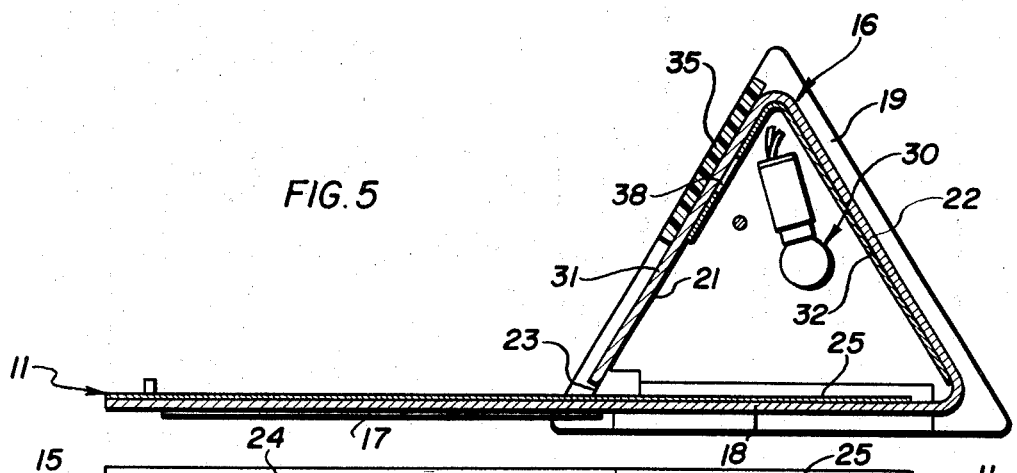
FIG. 5 is a vertical sectional view taken substantially along line 5—5 of FIG. 4.

The machine 10, as seen in FIGS. 1 to 5, includes generally a base 15 and a housing 16 at one end of the base. The base 15 in the form of a flat plate includes a question area 17 and an answer area 18. Terminals are applied to the top surface of the base in the answer area preferably as printed circuitry, while nothing is applied to the top surface of the base in the answer area. The housing 16 covers the answer area 18 and includes generally a pair of opposed side walls 19 and 20, a front wall 21 and a rear wall 22. The front and rear walls are inclined wherein viewing the housing in cross-section, as shown in FIG. 5, illustrates the housing is somewhat triangular in cross-section. However, it can take any suitable geometrical form. The purpose of the housing is to provide an area for concealing the answer section except when beginning the use of a card and when a correct answer is chosen for a question. At those times it is generally desirable to see the answer section not only to indicate when choosing a correct answer but also to provide teaching information for solving the other problems. Preferably, in order to minimize costs, the base and the front and rear walls of the housing are made from a single piece of material and which preferably would be a semi-opaque plastic material. The opposed side walls could likewise be made of a plastic material which is preferably opaque. Further, the front wall 21 of the housing terminates above the base to define a slot 23 for permitting the insertion of the answer section of the card when orienting a card on the machine.

The card 11 includes a question or problem section 24 and an answer section 25, and it can be seen in FIGS. 2 and 5 that the answer section 25 is received within the housing 16, while the question section 24 aligning with the question area 17 of the base is exposed to the user at all times.

A light source 30 of any suitable type is mounted within the housing 16 to illuminate the answer section when energized so that it can be viewed through the semi-opaque window 31. Accordingly, when the light source is not energized, it will not be possible to view the answer section because the illumination within the housing is not sufficient. In order to prevent other outside sources of illumination from penetrating the front and back walls of the housing which may be made of the same material as the semi-opaque window 31, a strip or liner 32 of opaque material, such as cardboard or the like, is applied to the inner side of the rear wall 22 and most of the front wall 21 down to the window 31, as seen particularly in FIG. 5. It will also be appreciated that the end walls 19 and 20 are preferably of an opaque material.

Alternatively, the machine may be operated with the semi-opaque window 31 covered by a shield or shutter 35 of opaque material, such as an opaque plastic, which is hinged to the side walls 19 and 20 by pins 36 and 37 (FIG. 4). The shield 35 is shown in position to expose the semi-opaque window 31 in FIGS. 1, 2, 4 and 5 and in position to close or conceal the window in FIG. 3. Accordingly, the shield 35 may be swung to its up position exposing the semi-opaque window 31 or to its down position concealing the window so that when the light source 30 is energized, the answer section of the card cannot be observed through the semi-opaque window. When the shield is in the down position, energization of the light source is detected by a cutout 38 in the opaque liner or strip 32 defining a small window 39, as seen in FIG. 3, along the front wall 21 to signal the user when the start terminal or a correct answer terminal is engaged by the probe. Thus, if it is not desired to see the answer section between answering each of the question, the shield 35 would be swung to the down position shown in FIG. 3.

The card 11, as seen in FIG. 6, includes six questions or problems 41, 42, 43, 44, 45 and 46, although it may be appreciated that any number of questions or problems could be provided on any card. Each problem includes one or more balls and three multiple-choice answers, each of which is in alignment with a hole extending through the card. For example, question 41, which includes a single ball, has also associated therewith answers 1, 2 or 3, each of which has adjacent therethrough a hole 41a, 41b or 41c. Adjacent the top of the question section 24 is the word "reset" and a reset hole 47 adjacent thereto and the word "start" together with a start hole 48 adjacent thereto. A probe 50 which is adapted to be hand held is provided for engaging in the holes of the question section 24. The very end of the probe is sized so that it will freely enter and penetrate the holes in the card.

While the questions or problems on a card may take any desired form, the mathematical problems on the card 11 are such that in the first row where problems 41, 42 and 43 are arranged, it will be seen that the answers to each are located in different positions, while in the second row where problems 44, 45 and 46 are arranged, the answers are likewise located in different positions and in different order from top to bottom than those in the first row. It is desirable to arrange the problems and answers so that there would not be any repetition which could be relied on for obtaining correct answers and so the full intellect of the user is tested. It can be appreciated that the problems on card 11 are set up so that the correct answer relative to the location of the answer holes are preferably in different positions. Inasmuch as the machine is best adaptable for a multiple-choice type question, it can be seen that any number of possible answers can be provided for each problem and that the card illustrated is used to facilitate explanation of the invention. Only three card answers are illustrated in the answer section 25 as these are the only possibilities for the problems presented.

The question section 17 of the base includes correct terminals, incorrect terminals, a start terminal and a reset terminal. All of the correct terminals are connected in common, while all of the incorrect terminals are connected in common. The start terminal is connected in common with the correct terminals. The question area is set up for illustrative purposes to include six sets of question answering terminals 51, 52, 53, 54, 55 and 56, as seen in FIG. 4, all within the printed circuit 57. The lines within the printed circuit 57 represent electrical insulation between areas defining a common correct terminal 60, a common incorrect terminal 61 and a reset terminal 62. Each set of question answering terminals effectively includes eight incorrect terminals all connected in common, arranged together in vertical and horizontal row configuration to accommodate cards having multiple-choice questions with three answers so that the row of answer holes in a card for each question may register with any one of the three vertical rows of terminals in a set of question answering terminals and so that only one of the correct answer terminals of any set of question answering terminals registers with an answer hole in the card. This permits designing a set of cards for a machine where the correct answer for a question of a given position on the card need not be in the same position all the time and may take any number of positions. Specifically, in reference to the set of question answering terminals 51 having rows 51a, 51b and 51c along the vertical and rows 51d, 51e, 51f and 51g along the horizontal, correct terminals are provided in row 51a in two locations and in rows 51b and 51c in two different locations. It can be appreciated that any arrangement of correct and incorrect terminals may be made to accommodate cards having answer holes in any desired location as noted in FIG. 6. The answer holes of the card illustrated align with the third row 51c of answer terminals. Moreover, the correct answer terminal for each question in the first row registers with a correct answer hole in the card in a different location, thereby minimizing guessing based upon location. Similarly, the second row of questions has the answer holes aligned with the third row of answer terminals so that the location of the correct answers is not the same as the question horizontally aligned from the first vertical row. This arrangement of answer terminals and answer holes in cards enables the patterns for machines to even be varied if desired to prevent similarity between machines, thereby further inhibiting guessing or copying.

The terminals, together with the hand-held probe 50 and the light source 30, are connected into a solid state circuit and to a power source as illustrated by the schematic diagram in FIG. 7. The circuit includes an SCR 68 which is rendered conducting when the probe 50 makes contact with the correct terminal 60. In the event the probe 50 makes contact with the incorrect terminal 61, the SCR 68 is rendered non-conducting and will not conduct thereafter if the probe 50 engages the correct terminal 60 unless the probe 50 is first placed into engagement with the reset terminal 62. The correct terminal 60 is connected in common to one end of a resistor 69 and the anode of the SCR 68. The incorrect terminal 61 is connected in common to the other end of the resistor 69 and the positive terminal of an electrolytic capacitor 70. The reset terminal 62 is connected to the gate of the SCR through a current limiting resistor 71. The negative terminal of the electrolytic capacitor 70 is connected in common to the gate of the SCR and the resistor 71. A resistor 72 is connected between the cathode and the gate of the SCR to prevent the gate from becoming positively charged with respect to the cathode. Power is provided to the solid state circuitry and the light source 30 by any suitable means and illustrated here is a transformer 75 having a primary winding 75a and a secondary winding 75b. The primary winding is connected through a main switch 76 to a standard electrical plug 77 that can be connected to the usual 115 volt alternating current source. The transformer 75 would step down the voltage to about 12 volts in the secondary winding 75b which would be rectified by a diode rectifier 78 for the solid state circuitry and the light source. As can be appreciated, the circuitry is provided with a minimum of components. The values of said component would include providing the rectifier and SCR with 1 amp. ratings, resistor 69 with a value of 62K ohms, capacitor 70 with a value of 5 microfarads, resistor 71 with a value of 100 ohms and the resistor 72 with a value of 2.2K ohms.

The operation of the machine would first require the application of power to the circuitry and then the proper orientation of a question card on the machine. In order to obtain the proper orientation, each card includes positioning or orientation holes 80 and 81 which are adapted to respectively fit on positioning or orientation pins 82 and 83. As seen in FIG. 1, the sets of question answering terminals 51 to 56 are represented, together with the start and reset terminals 60 and 62. It should be appreciated here that the start terminal 60 is the same as the card terminals of each of the set of question answering terminals. Following the positioning of the card on the machine, the user may then proceed to operate the machine. First, the user would take the hand-held probe 50 and apply it to the start hole 48 by engaging the start terminal and causing the light source 30 to be energized so that the answer section of the card could be viewed through the semi-opaque window 31. When the probe 50 engages the start terminal or the correct terminal 60, a triggering pulse is applied to the gate of the SCR 68 so that the SCR will conduct and turn on the light source 30. This will permit the user to view the answer area of the card before commencing to answer the questions. Removal of the probe from the start terminal de-energizes the light source to once again make the answer area concealed so that the user must depend upon his memory and knowledge in order to answer the questions. As long as the user thereafter continues to apply the probe through a correct answer hole in the card to engage a correct answer terminal, the circuit will operate to continually illuminate the area within the housing 16 so that the answer area of the card can be viewed through the semi-opaque window, although it may merely be noticed from the standpoint that a correct answer signal is generated by the light source. In the event the user applies the probe in an incorrect answer hole to engage the incorrect terminal 61, the capacitor 70 is charged to the full potential of the secondary winding 75b of the transformer. This blocks current flow through the resistor 69 in the event the probe is thereafter placed in contact with the correct terminal 60 and thereby prevents triggering of the SCR and energization of the light source. This thereby prevents guessing as to the answer of a question once the wrong answer is chosen. To continue answering of the questions, the user must then reset the circuitry by applying the probe 50 through the reset hole 47 of the card to engage the reset terminal 62, thereby applying a voltage of a polarity that will discharge the capacitor 70. Thereafter, application of the probe 50 to the correct terminal 60 will again permit triggering of the SCR to allow energization of the light source 30.

From the foregoing, it will be appreciated that the machine of the present invention discourages guessing answers to multiple-choice questions and is especially adaptable for teaching so as to provide correct answer information when desired and when correctly answering questions on the card. Additionally, the permitting of viewing the answer section between questions in the event of a correct answer to a previous question signals the user as to a correct answer. Moreover, the feature of preventing viewing the correct answer between questions is also possible with the machine of the present invention.

It will be understood that modifications and variations may be effected without departing from the scope of the novel concepts of the present invention, but it is understood that this application is to be limited only by the scope of the appended claims.

The invention is hereby claimed as follows:

1. A teaching machine adapted to use interchangeable cards of electrical insulating material, wherein each card includes a question section and a correct answer section, said question section including a plurality of questions with multiple-choice answers, one of which for each question is correct and at least one of which for each question is incorrect, each card including a hole therethrough adjacent each of the answers and start and reset holes therethrough in the question section, said machine comprising a base for supporting a card and onto which a card may be oriented, terminals on the base registering with the holes, a housing on the base receiving the answer section thereby leaving exposed the question section, said housing including a semi-opaque window, light means in said housing functioning when energized to permit visual reading of the answer section through the window, a hand-held probe for entering the holes in the card to contact the terminals, and electrical circuit means connected to said terminals, probe, and light means responsive to energize the light means when contact by the probe is first made with the terminals of said start hole or the correct answer hole of each question and to prevent energization of the light means in the event contact by the probe is first made with a terminal of an incorrect answer hole until contact by the probe is next made with the terminal of the reset hole.

2. A teaching machine as defined in claim 1, wherein said housing further includes a second window positioned remote from a view of the answer section to merely indicate when the light means is energized during designation of a correct answer, and shield means for covering said semi-opaque window and uncovering said second window.

3. A teaching machine as defined in claim 1, wherein said terminals include correct answer terminals connected in common, incorrect answer terminals connected in common, a start terminal connected in common to said correct answer terminals, and a reset terminal, and said terminals positioned to respectively register with the correct, incorrect, start and reset holes of a card.

4. A teaching machine as defined in claim 3, wherein said circuit means includes a switching means associated with said light means, a correct circuit portion for triggering said switching means to energize the light means, an incorrect circuit portion for conditioning the switching means to prevent triggering thereof, and a reset circuit portion for conditioning the switching means to permit triggering thereof.

5. A teaching machine as defined in claim 4, wherein said probe and the terminals define switch contact means for energizing each of the circuit portions.

6. A teaching machine as defined in claim 4, wherein said switching means includes an SCR.

7. A teaching machine as defined in claim 6, wherein said incorrect circuit portion includes a capacitor which when fully charged by contact of the probe with a terminal of an incorrect answer hole prevents firing of the SCR.

8. A teaching machine as defined in claim 1, wherein correct answer terminals and incorrect answer terminals are arranged on said base to accommodate cards having the correct answer hole in different locations relative the incorrect answer holes.

9. A teaching machine adapted to use interchangeable cards of electrical insulating material, wherein each card includes a question section and a correct answer section, said question section including a plurality of questions with multiple-choice answers, one of which for each question is correct and at least one of which for each question is incorrect, each card including a hole therethrough adjacent each of the answers and start and reset holes therethrough in the question section, said machine comprising a base in the form of a generally flat plate having a question area and a correct answer area, a housing over the correct answer area including a semi-opaque window which allows viewing the answer area upon illumination of same, an illumination source within said housing, a plurality of sets of question answer terminals on said question area of the base some of which register with the answer holes of the card, said question answer terminals including correct and incorrect answer terminals, start and reset terminals on said question area registering with the start and reset holes of the card, said start terminal being connected in common to said correct answer terminals, and electric circuit means connected to said terminals, probe and illumination source, said circuit means including a switching means that is triggered "on" when contact by the probe is first made with either the start terminal or a correct terminal and that is prevented from being triggered on by such contact if contact is first made with an incorrect terminal until contact is next made with the reset terminal.

10. A teaching machine as defined in claim 9, and means on the base coacting with means on the card for orienting the card to provide proper registry between the holes in the card and the terminals on the base.

11. A teaching machine as defined in claim 10, and shutter means for selectively covering said semi-opaque window to prevent viewing of the answer section of a card upon choosing a correct answer to a question.

12. A teaching machine as defined in claim 11, and window means for signaling to the operator a correct answer choice when the shutter means covers the semi-opaque window.

13. A teaching machine adapted to use interchangeable cards of electrical insulating material, wherein each card includes a question section and a correct answer section, said question section including a plurality of questions with multiple-choice answers, one of which for each question is correct and at least one of which for each question is incorrect, each card including a hole therethrough adjacent each of the answers and a start hole therethrough, said machine comprising a base for supporting a card and onto which a card may be oriented, terminals on the base registering with the holes, a housing on the base defining a compartment receiving the answer section thereby leaving exposed the question section, said housing including a semi-opaque window, light means in said compartment functioning when energized to permit visual reading of the answer section through the window, a hand-held probe for entering the holes in the card to contact the terminals, and electrical circuit means connected to said terminals, probe, and light means responsive to energize the light means when contact by the probe is made with the terminals of said start hole or the correct answer hole of each question to illuminate the compartment and render the answer section readable through the semi-opaque window.

14. A teaching machine as defined in claim 13, and means on the base coacting with means on the card for orienting the card to provide proper registry between the holes in the card and the terminals on the base.

15. A teaching machine as defined in claim 14, and shutter means for selectively covering said semi-opaque window to prevent viewing of the answer section of a card upon choosing a correct answer to a question.

16. A teaching machine as defined in claim 13, wherein said circuit means includes means preventing energization of the light means in the event contact by the probe is first made with a terminal of an incorrect answer.

17. A teaching machine as defined in claim 16, wherein said circuit means includes a reset terminal on said base, and each card including a reset hole in the question section, whereby following the contact of the reset terminal by the probe further contact by the probe of a correct answer terminal will energize the light means.

18. A teaching machine adapted to use interchangeable cards of electrical insulating material, wherein each card includes a question section and a correct answer section, said question section including a plurality of questions with multiple-choice answers, one of which for each question is correct and at least one of which for each question is incorrect, each card including a hole therethrough adjacent each of the answers, said machine comprising a base for supporting a card and onto which a card may be oriented, terminals on the base registering with the holes, a housing on the base defining a compartment receiving the answer section thereby leaving exposed the question section, said housing including a semi-opaque window, light means in said compartment functioning when energized to permit visual reading of the answer section through the window, a hand-held probe for entering the holes in the card to contact the terminals, and electrical circuit means connected to said terminals, probe, and light means responsive to energize the light means when contact by the probe is made with the terminals of the correct answer hole of each question to illuminate the compartment and render the answer section readable through the semi-opaque window.

* * * * *